US012792163B2

(12) United States Patent
Koike

(10) Patent No.: US 12,792,163 B2
(45) **Date of Patent: *Nov. 10, 2026**

(54) INTEGRATED CIRCUIT FOR USE IN STYLUS

(71) Applicant: Wacom Co., Ltd., Saitama (JP)

(72) Inventor: Takeshi Koike, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/263,257

(22) Filed: Jul. 8, 2025

(65) Prior Publication Data

US 2025/0335047 A1 Oct. 30, 2025

Related U.S. Application Data

(63) Continuation of application No. 18/767,386, filed on Jul. 9, 2024, now Pat. No. 12,379,797, which is a continuation of application No. PCT/JP2023/002927, filed on Jan. 30, 2023.

(51) Int. Cl.
*G06F 3/038* (2013.01)
*G06F 3/0354* (2013.01)

(52) U.S. Cl.
CPC ........ *G06F 3/0383* (2013.01); *G06F 3/03545* (2013.01)

(58) Field of Classification Search
CPC ........................... G06F 3/03545; G06F 3/0442
USPC ........................................................ 345/179
See application file for complete search history.

(56) References Cited

U.S. PATENT DOCUMENTS

2021/0055828 A1* 2/2021 Miyamoto ............ G06F 3/0383

FOREIGN PATENT DOCUMENTS

| | | | | |
|---|---|---|---|---|
| CN | 105929985 A | * | 9/2016 | ......... G06F 3/03547 |
| CN | 107526453 B | * | 6/2020 | ......... G06F 3/03545 |
| JP | 2002215317 A | | 8/2002 | |

OTHER PUBLICATIONS

International Search Report, mailed Apr. 11, 2023, for International Patent Application No. PCT/JP2023/002927. (5 pages) (with English translation).

* cited by examiner

*Primary Examiner* — Koosha Sharifi-Tafreshi
(74) *Attorney, Agent, or Firm* — Seed Intellectual Property Law Group LLP

(57) ABSTRACT

To reduce an increase in the burden of designing circuits used in a pen pressure sensor, provided is a stylus including a detection circuit that is connectable to a pen pressure sensor that, in operation, acquires pen pressure data of the stylus, the pen pressure sensor being a capacitive sensor in which a capacitance value changes according to applied force or a resistive sensor in which a resistance value changes according to applied force, the detection circuit can selectively operating in a first mode and a second mode, the detection circuit, in operation, acquiring the pen pressure data based on the capacitance value of the pen pressure sensor while the detection circuit operates in the first mode, and the detection circuit, in operation, acquiring the pen pressure data in reference to the resistance value of the pen pressure sensor while the detection circuit operates in the second mode.

14 Claims, 9 Drawing Sheets

SECOND MODE (RESISTIVE SENSOR)

FIRST EMBODIMENT

FIRST EMBODIMENT

FIRST MODE (CAPACITIVE SENSOR)

MODIFICATION OF FIRST EMBODIMENT

MODIFICATION OF FIRST EMBODIMENT

SECOND EMBODIMENT

SECOND EMBODIMENT

SECOND EMBODIMENT

INTEGRATED CIRCUIT FOR USE IN STYLUS

BACKGROUNDS

Technical Field

The present disclosure relates to a stylus.

Description of the Related Art

Conventionally, various pen-shaped devices called styluses are proposed as devices with position indication functions used to create illustrations or process photographs (for example, see Patent Document 1). A position indicator (stylus) including a pen pressure sensor is disclosed in Patent Document 1.

PRIOR ART DOCUMENT

Patent Document

Patent Document 1: Japanese Patent Laid-Open No. 2002-215317.

BRIEF SUMMARY

Technical Problem

A capacitive sensor in which capacitance changes according to the pen pressure caused by the operator and a resistive sensor in which a resistance value changes according to the pen pressure caused by the operator are, for example, used in the pen pressure sensor installed on the stylus. Although which one of the capacitive sensor and the resistive sensor is to be installed on the stylus is determined according to the situation and the like, there is a problem that the circuit that drives the capacitive sensor and the circuit that drives the resistive sensor are different and both circuits (circuit boards) hence need to be designed.

The present disclosure has been made in view of the circumstances, and an object of the present disclosure is to reduce an increase in the burden of designing circuits used in a pen pressure sensor.

Technical Solution

According to the present disclosure, a stylus with the following configuration is provided.

[1] A stylus including a detection circuit, in which the detection circuit is connectable to a pen pressure sensor that, in operation, acquires pen pressure data of the stylus, the pen pressure sensor is a capacitive sensor in which a capacitance value changes according to applied force or a resistive sensor in which a resistance value changes according to applied force, the detection circuit selectively operates in a first mode and a second mode, the detection circuit, in operation, acquires the pen pressure data based the capacitance value of the pen pressure sensor while the detection circuit operates in the first mode, and the detection circuit, in operation, acquires the pen pressure data based on the resistance value of the pen pressure sensor while the detection circuit operates in the second mode.

According to the present disclosure, the detection circuit selectively operates in the first mode in which the pen pressure data is acquired based on the capacitance value, and the second mode in which the pen pressure data is acquired based on the resistance value. The detection circuit is able to operate regardless of which one of the capacitive sensor and the resistive sensor is installed, and this can reduce the burden of designing dedicated boards corresponding to the types of pen pressure sensors to be installed. Thus, the increase in the burden of designing the circuits to be used in the pen pressure sensor can be reduced in the present disclosure.

Hereinafter, various embodiments of the present disclosure will be illustrated. The embodiments illustrated below can be combined with each other.

[2] Provided is the stylus according to [1], in which the detection circuit includes a capacitance detection circuit and a resistance detection circuit, the capacitance detection circuit is driven when the detection circuit operates in the first mode, and the resistance detection circuit is driven when the detection circuit operates in the second mode.

[3] Provided is the stylus according to [2], in which the capacitance detection circuit and the resistance detection circuit include a common analog/digital (AD) circuit, and the common AD circuit, in operation, converts an analog signal from the pen pressure sensor into a digital signal and is used in common while the detection circuit operates in in the first and second modes.

[4] Provided is the stylus according to [3], in which the common AD circuit is a comparator, the capacitance detection circuit includes a first feedback circuit, and the first feedback circuit, in operation, performs delta-sigma conversion of an output signal from the common AD circuit, and feeds back the output signal to an input of the common AD circuit, in the first mode.

[5] Provided is the stylus according to [3] or [4], in which the common AD circuit is a comparator, the resistance detection circuit includes an amplification circuit, an integration circuit, and a second feedback circuit, the amplification circuit in operation, amplifies an output signal from the resistive sensor, an input of the integration circuit is connected to the amplification circuit, an output of the integration circuit is connected to the common AD circuit, and the second feedback circuit, in operation, perform delta-sigma conversion of an output signal from the common AD circuit and feed back the output signal to the input of the integration circuit while the detection circuit operates in the second mode.

[6] Provided is the stylus according to [2], further including a connector including a plurality of terminal portions, in which the detection circuit is connectable to the pen pressure sensor through the connector, the capacitance detection circuit, in operation, acquires the pen pressure data based on an output signal from a terminal portion connected to an output of the capacitive sensor among the plurality of terminal portions, and the resistance detection circuit, in operation, acquires the pen pressure data based on a voltage difference between the plurality of terminal portions.

[7] Provided is the stylus according to [6], in which a number of the plurality of terminal portions is three or less, and at least some of the plurality of terminal portions are used in common while the detection circuit operates in the first and second modes.

[8] Provided is the stylus according to [6] or [7], in which the plurality of terminal portions include first and second terminal portions, when the detection circuit operates in the first mode, the output of the capacitive sensor is connected to the first terminal portion, and the second terminal portion is connected to a ground, and when the detection circuit operates in the second mode, the resistive sensor is connected to the first and second terminal portions.

[9] Provided is the stylus according to any one of [6] to [8], further including a power supply, in which the plurality of terminal portions include a third terminal portion, and the third terminal portion connects the power supply and the resistive sensor when the detection circuit operates the second mode.

[10] Provided is the stylus according to any one of [1] to [9], further including a capacitor connected to a resistor included in the resistive sensor.

[11] Provided is the stylus according to any one of [2] to [10], in which the capacitance detection circuit includes a reset switch, and the reset switch resets a voltage of a node connected to the pen pressure sensor in the capacitance detection circuit to a ground voltage.

[12] Provided is the stylus according to [11], in which the resistance detection circuit is not connected to the reset switch.

[13] Provided is the stylus according to any one of [2] to [12], further including a mode controller, in which the mode controller, in operation, drives one of the capacitance detection circuit or the resistance detection circuit based on firmware stored in the stylus, and the firmware causes the mode controller to drive the capacitive sensor or the resistive sensor.

[14] Provided is a stylus including a detection circuit, in which the detection circuit is connectable to both a capacitive sensor and a resistive sensor at the same time, a capacitive value of the capacitive sensor changes according to applied force, a resistance value of the resistive sensor changes according to applied force, the detection circuit selectively operates in a first mode and a second mode, the detection circuit acquires pen pressure data of the stylus based on an output signal from a first one of the capacitive sensor and the resistive sensor while the detection circuit operates in the first mode, the detection circuit acquires touch data of the stylus based on an output signal from the a second one of the capacitive sensor and the resistive sensor while the detection circuit operates in the second mode, and the touch data is data related to contact of a surface of the stylus and a finger.

DISCLOSURE DETAILED DESCRIPTION

Hereinafter, embodiments will be described in reference to the drawings. Various features illustrated in the embodiments illustrated below can be combined with each other. In addition, an invention is independently established for each feature.

1. FIRST EMBODIMENT

1-1. Description of Overall Configuration

Figure 1:
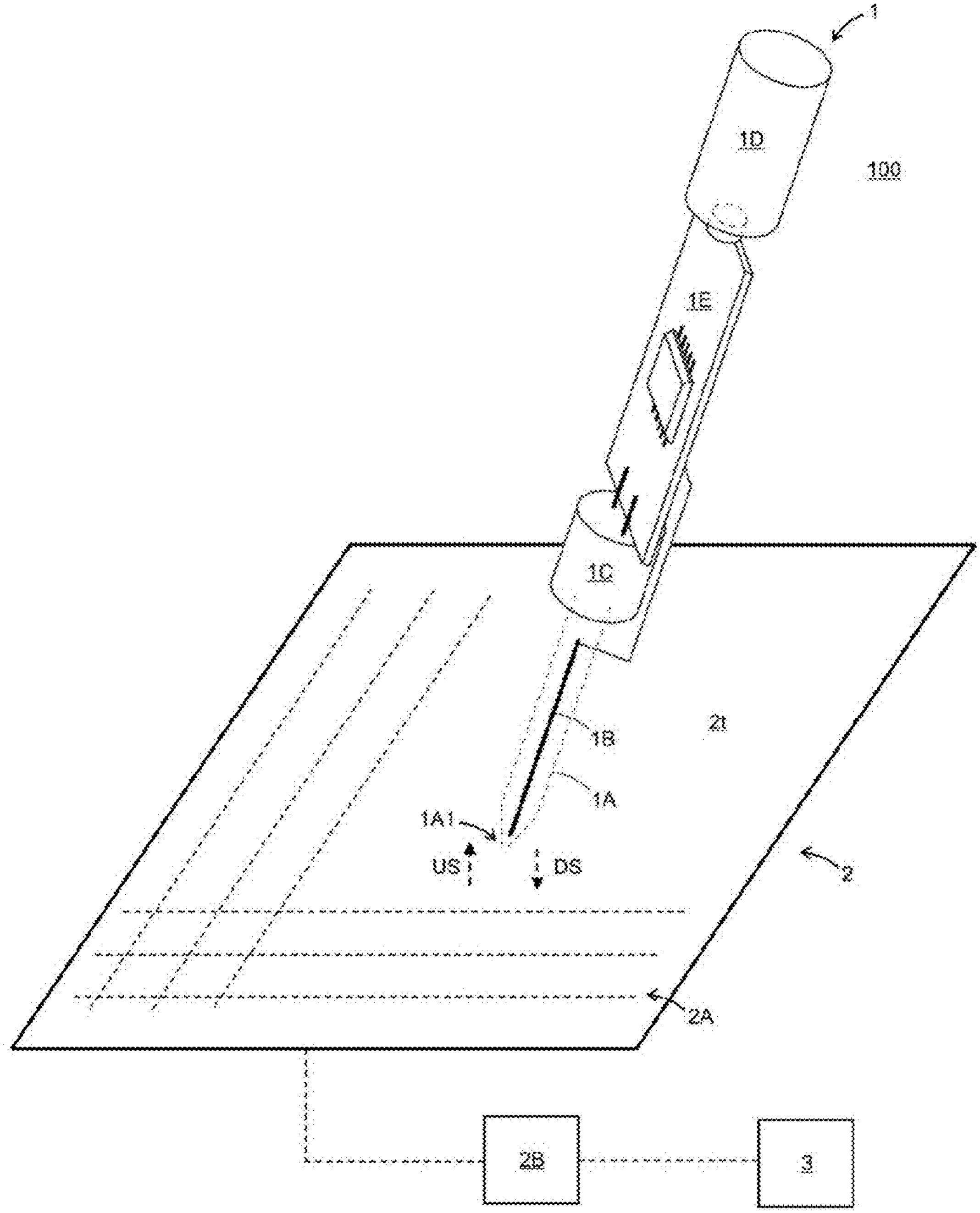
FIG. 1 is a schematic view illustrating a schematic configuration of a stylus system 100 including a stylus 1 according to a first embodiment.

A stylus 1 according to a first embodiment is included in a stylus system 100 that draws an image on a display device (for example, a liquid crystal display, an organic electroluminescence (EL) display, electronic paper, or the like). As illustrated in FIG. 1, the stylus system 100 includes the stylus 1, a sensor apparatus 2, and a host computer 3. The position of the stylus 1 is detected by the sensor apparatus 2, and the host computer 3 generates stroke data of the stylus 1 in reference to the position (position data) of the stylus 1 detected by the sensor apparatus 2. The stylus system 100 can draw an image on the display device in reference to the stroke data of the stylus 1.

Note that the stylus system 100 may be, for example, tablet electronic equipment in which the display device and the sensor apparatus 2 are stacked and integrated or may be smaller electronic equipment (for example, a smartphone or the like). Moreover, the display device and the sensor apparatus 2 may be independent of each other. That is, the stylus system 100 may not include the display device, and the output of the stylus system 100 may be displayed on an external display device.

The stylus 1 is an electronic pen corresponding to various types, such as a capacitive coupling type (active ES (registered trademark) type) and an electromagnetic resonance type (EMR (registered trademark) type). As illustrated in FIG. 1, the stylus 1 includes a core body 1A, a stylus electrode 1B, a pen pressure detector 1C, a power supply 1D, and a circuit board 1E.

The core body 1A is a rod-shaped member arranged such that the longitudinal direction of the core body 1A coincides with the axial direction of the stylus 1, and one end of the core body 1A includes a tip portion 1A1 of the stylus 1. The stylus electrode 1B is provided on the core body 1A.

The stylus electrode 1B contains a conductive material, and the stylus electrode 1B is provided, for example, near the tip of the core body 1A. The stylus electrode 1B is electrically connected to the circuit board 1E through wiring. The circuit board 1E is used to transmit and receive various signals, such as an uplink signal US and a downlink signal DS described later, through the stylus electrode 1B.

The pen pressure detector 1C includes a module including a pen pressure sensor SE. The pen pressure detector 1C is configured to detect force (pen pressure) applied to the tip portion 1A1. The pen pressure detector 1C is physically connected to the core body 1A. Further, when a user presses the tip portion 1A1 of the stylus 1 against a touch surface 2*t* of the sensor apparatus 2, the pressing force is transmitted to the core body 1A, and the pen pressure detector 1C can detect the force applied to the tip portion 1A1.

In the first embodiment, the pen pressure sensor SE is a capacitive sensor SE1 or a resistive sensor SE2. In the first embodiment, only one of the capacitive sensor SE1 or the resistive sensor SE2 is provided on the pen pressure detector 1C. In addition, the circuit board 1E has such a circuit configuration that the circuit board 1E can operate regardless of which one of the capacitive sensor SE1 or the resistive sensor SE2 is provided on the pen pressure detector 1C. That is, the circuit board 1E has both a function of operating according to the capacitive sensor SE1 and a function of operating according to the resistive sensor SE2.

The capacitive sensor SE1 can easily detect a small pen pressure and can easily reduce the power consumption. On the other hand, the capacitive sensor SE1 has hysteresis characteristics. Thus, the capacitive sensor SE1 is characterized in that the voltage value varies between the pen pressure at the time of rise in pen pressure and the pen pressure at the time of drop in pen pressure, even when the pen pressure is the same.

The resistive sensor SE2 has linear characteristics, and the hysteresis characteristics are small. On the other hand, the resistive sensor SE2 has a small range of operating voltage, and the influence of noise needs to be taken into account more. The resistive sensor SE2 is also characterized in that the calibration for setting the initial pen pressure is troublesome, and the power consumption tends to be large due to flow of the current after division of the power supply voltage.

In this way, the capacitive sensor SE1 and the resistive sensor SE2 have respective features, and thus, which one of the sensors is to be installed on the stylus 1 is determined according to the situation.

The capacitive sensor SE1 includes a variable capacitance body (variable capacitance element) in which a capacitance value (capacitance value) changes according to applied force.

Note that the capacitance value (pF) of the capacitive sensor SE1 is, for example, in a range of 10 to 500. Specific examples of the capacitance value (pF) of the capacitive sensor SE1 include 10, 15, 20, 25, 30, 35, 40, 45, 50, 55, and 60, and the capacitance value (pF) may be in a range between two of the values illustrated here. In addition, specific examples of the capacitance value (pF) include 100, 150, 200, 250, 300, 350, 400, 450, and 500, and the capacitance value (pF) may be in a range between two of the values illustrated here.

The resistive sensor SE2 includes resistors (resistance elements) in which resistance values change according to applied force. The resistive sensor SE2 includes resistors R1 to R4, and the resistors R1 to R4 form a bridge circuit. When the force (pen pressure) is applied to the resistive sensor SE2, the resistance values of the resistors R1 and R4 are R−ΔR, and the resistance values of the resistors R2 and R3 are R+ΔR. Here, R represents the resistance values (resistance initial values) of the resistors R1 to R4 when the force (pen pressure) is not applied to the resistive sensor SE2, and ΔR represents amounts of change from the resistance initial values of the resistors R1 to R4 when the force (pen pressure) is applied to the resistive sensor SE2.

Note that the resistance R (Ω) of the resistive sensor SE2 is in a range of, for example, 100 Ω to 500 kΩ. Specific examples of the resistance R (Ω) of the resistive sensor SE2 include 100, 200, 300, 400, 500, 600, 700, 800, 900, and 1000, and the resistance R (Ω) may be in a range between two of the values illustrated here. Specific examples of the resistance R (kΩ) of the resistive sensor SE2 include 10, 20, 30, 40, 50, 60, 70, 80, 90, 100, 150, 200, 250, 300, 350, 400, 450, and 500, and the resistance R (kΩ) may be in a range between two of the values illustrated here.

The power supply 1D is a voltage source used to supply operating power (direct current (DC) voltage) to the circuit board 1E, and for example, a battery can be adopted. Note that, when, for example, the electromagnetic resonance type (EMR (registered trademark) type) is adopted in the stylus 1, the stylus 1 can be configured to use the power obtained by electromagnetic induction and drive such circuits as the circuit board 1E. Thus, the stylus 1 may not be provided with the battery in this case.

The sensor apparatus 2 is a position detection apparatus corresponding to various types, such as the capacitive coupling type (active ES (registered trademark) type) and the electromagnetic resonance type (EMR (registered trademark) type). The sensor apparatus 2 includes a sensor 2A that receives an input operation performed by the stylus 1 and a sensor controller 2B including an integrated circuit. In addition, an upper surface portion of the sensor apparatus 2 is a touch surface of the stylus 1, and the sensor 2A is arranged in a lower layer of the upper surface portion.

The sensor 2A includes a plurality of electrodes arranged in parallel. In addition, the sensor controller 2B detects the position of the stylus 1 through the sensor 2A, and receives the signal (hereinafter, referred to as the "downlink signal DS") transmitted by the stylus 1 through the sensor 2A, to receive the data transmitted by the stylus 1.

The downlink signal DS includes an unmodulated burst signal and a data signal modulated by various types of data.

The burst signal is a signal used by the sensor controller 2B to detect the position of the stylus 1. The sensor controller 2B sequentially scans the plurality of electrodes included in the sensor 2A, to determine the electrodes receiving the burst signal and the strength of the signal received by the electrodes. The sensor controller 2B detects the position of the stylus 1 in reference to the results and generates position data of the stylus 1.

The data signal is a signal including various internal digital values acquired by the stylus 1. The internal digital values include, for example, pen pressure data, a pen pressure value described later, and a unique identification (ID) unique to the stylus 1. The sensor controller 2B uses, as an antenna, the electrode closest to the position of the stylus 1 among the plurality of electrodes included in the sensor 2A, to receive the downlink signal DS and thereby receive the data transmitted by the stylus 1, for example.

Note that the stylus system 100 may be configured to transmit a signal (uplink signal US) from the sensor controller 2B to the stylus 1 through the sensor 2A as an antenna. The uplink signal US can include an instruction (command) from the sensor controller 2B to the stylus 1. The stylus 1 can, for example, determine the transmission timing of the downlink signal DS according to the timing of the reception of the uplink signal US or can determine the transmission timing of the downlink signal DS in reference to the command included in the uplink signal US and determine the type of the internal digital value to be transmitted in the downlink signal DS.

The sensor controller 2B generates position data of the stylus 1 in reference to the burst signal of the downlink signal DS and transmits the position data and the pen pressure value obtained from the downlink signal DS to the host computer 3. The host computer 3 generates stroke data indicating the trajectory of the stylus 1 in reference to the position data and draws an image on the display device in reference to the stroke data and the pen pressure value.

1-2. Detailed Configuration of Stylus 1

The configuration of the stylus 1 will be described in detail below.

Figure 5A:
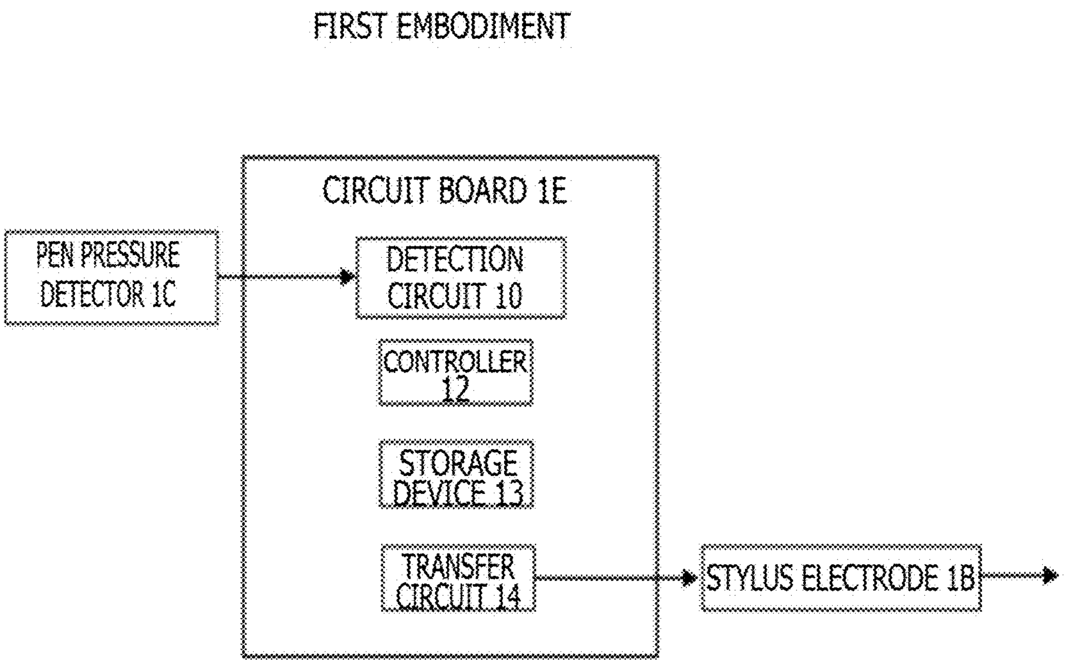
FIG. 5A is a functional block diagram of the circuit board 1E in the first embodiment.

As illustrated in FIG. 5A, the circuit board 1E includes a detection circuit 10, a connector 11 (see FIG. 2), a controller 12, a storage device 13, a transfer circuit 14, and capacitors 15. Note that, as illustrated in FIG. 2, the circuit board 1E is provided with arrangement units 15*t* on which the capacitors 15 described later are arranged.

The constituent elements of the circuit board 1E may be realized by software or may be realized by hardware. When the constituent elements are realized by software, a central processing unit (CPU) can execute a computer program to realize various functions. The program may be stored in a built-in storage device or may be stored in a computer-readable non-transitory recording medium. In addition, a program stored in an external storage device may be read, and the constituent elements may be realized by what is generally called cloud computing. When the constituent elements are realized by hardware, various circuits, such as application specific integrated circuit (ASIC), field programmable gate array (FPGA), and dynamically reconfigurable processor (DRP), can be used to realize the constituent elements. Although various types of information and concepts including the information are handled in the embodiments, they are expressed by levels of signal values with binary bit sets of 0 and 1, and the communication and the calculation can be executed according to the mode of the software or the hardware.

1-2-1. Detection Circuit 10

Figure 2:
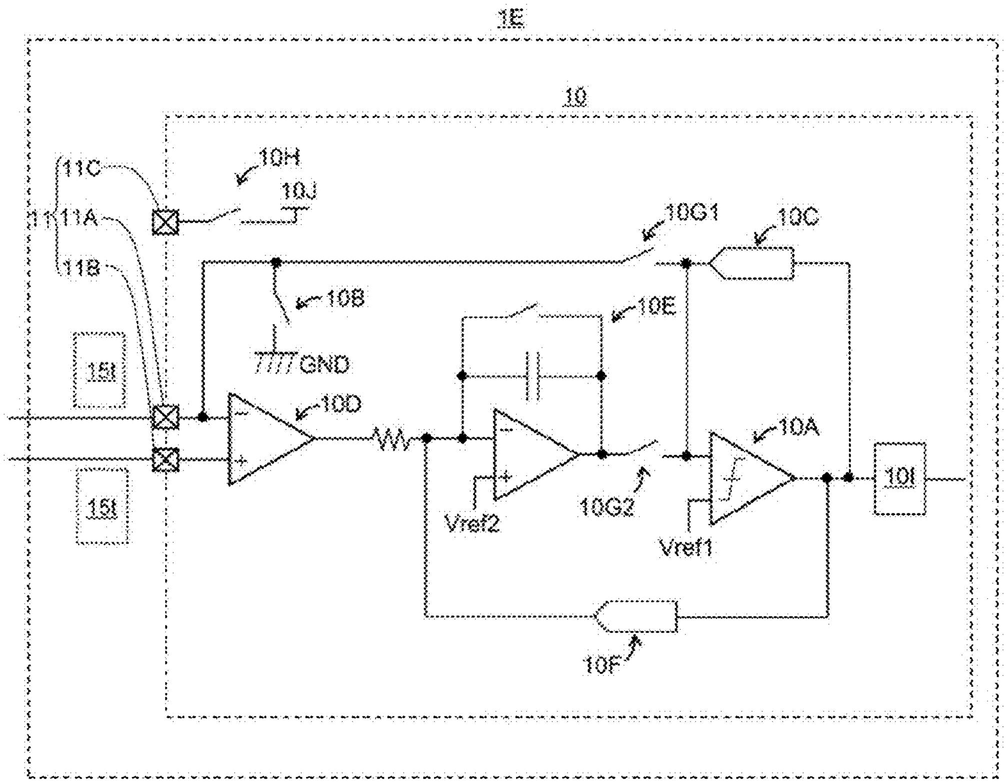
FIG. 2 is a circuit diagram illustrating a configuration of a circuit board 1E illustrated in FIG. 1.

The detection circuit 10 illustrated in FIG. 2 has a function of detecting the pen pressure corresponding to the operation performed by the user. The detection circuit 10 can be connected to the pen pressure sensor SE (the capacitive sensor SE1 or the resistive sensor SE2) that acquires the pen pressure data of the stylus 1. Moreover, the detection circuit 10 has a circuit configuration for both the capacitive sensor SE1 and the resistive sensor SE2. That is, the detection circuit 10 can generate the pen pressure data regardless of whether the pen pressure sensor SE is the capacitive sensor SE1 or the resistive sensor SE2.

The detection circuit 10 can selectively operates in a first and a second mode. Specifically, the detection circuit 10 does not operate in the second mode when the detection circuit 10 is operating in the first mode, and the detection circuit 10 does not operate in the first mode when the detection circuit 10 is operating in the second mode.

Here, the first mode is a mode executed when the capacitive sensor SE1 is installed as the pen pressure sensor SE on the stylus 1, and the detection circuit 10 generates the pen pressure data in reference to the capacitance value of the capacitive sensor SE1, in the first mode.

In addition, the second mode is a mode executed when the resistive sensor SE2 is installed as the pen pressure sensor SE on the stylus 1, and the detection circuit 10 generates the pen pressure data in reference to the resistance value of the resistive sensor SE2, in the second mode.

Constituent elements of the detection circuit 10 will be described. Note that although main constituent elements (circuits) of the detection circuit 10 will be described below, the constituent elements are not limited to the following constituent elements (circuits), and constituent elements (such as a filter) other than the constituent elements may be present. For example, a case of transmitting an output from the pen pressure sensor SE to any circuit may include not only a case of directly transmitting the output from the pen pressure sensor SE, but also a case of transmitting the output through another constituent element.

As illustrated in FIG. 2, the detection circuit 10 includes a common AD circuit 10A, a reset switch 10B, a first feedback circuit 10C, an amplification circuit 10D, an integration circuit 10E, a second feedback circuit 10F, mode selector switches 10G1 and 10G2, a power supply switch 10H, a digital filter 10I, and a power supply 10J. The detection circuit 10 can be, for example, an IC including a package of constituent elements of the detection circuit 10. In the embodiments, the detection circuit 10 as an IC is mounted on the circuit board 1E, and the capacitors 15 can be mounted on the arrangement units 15*t* of the circuit board 1E.

As described above, the detection circuit 10 has the circuit configuration for both the capacitive sensor SE1 and the resistive sensor SE2, and the detection circuit 10 can thus be described by dividing the detection circuit 10 into circuits with two functions. That is, the detection circuit 10 includes a capacitance detection circuit c1 (see FIG. 3) and a resistance detection circuit c2 (see FIG. 4), and ON and OFF of the mode selector switches 10G1 and 10G2 are controlled to selectively switch whether to drive the capacitance detection circuit c1 or to drive the resistance detection circuit c2. The state in which the first mode is executed corresponds to driving of the capacitance detection circuit c1, and the state in which the second mode is executed corresponds to driving of the resistance detection circuit c2.

Figure 3:
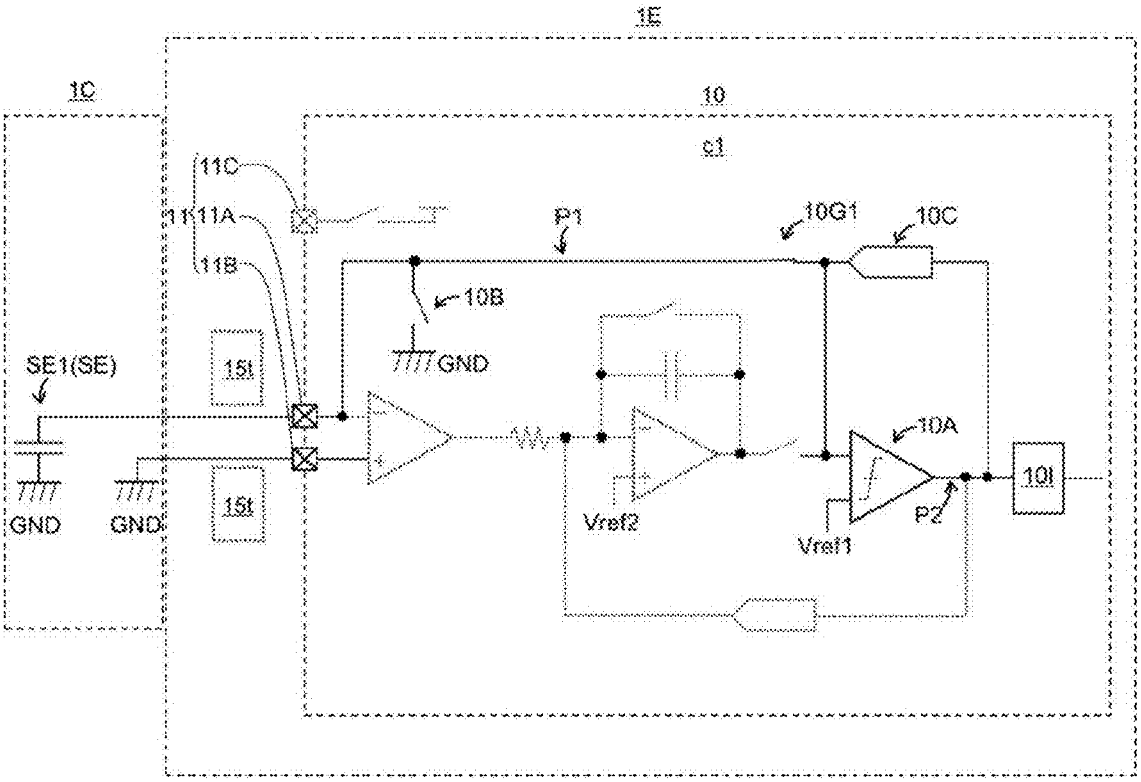
FIG. 3 is a schematic view illustrating a state in which a capacitive sensor SE1 is connected to a detection circuit 10 illustrated in FIG. 2 and the detection circuit 10 operates in a first mode. Note that the circuit part not in operation in FIG. 3 is schematically illustrated in dashed lines.

As illustrated in FIG. 3, the capacitance detection circuit cl includes the common AD circuit 10A, the reset switch 10B, the first feedback circuit 10C, the mode selector switch 10G1, and the digital filter 10I. Moreover, the capacitance detection circuit cl is configured to acquire the pen pressure data in reference to an output signal from a first terminal portion 11A connected to the output of the capacitive sensor SE1 among a plurality of terminal portions of the connector 11.

Figure 4:
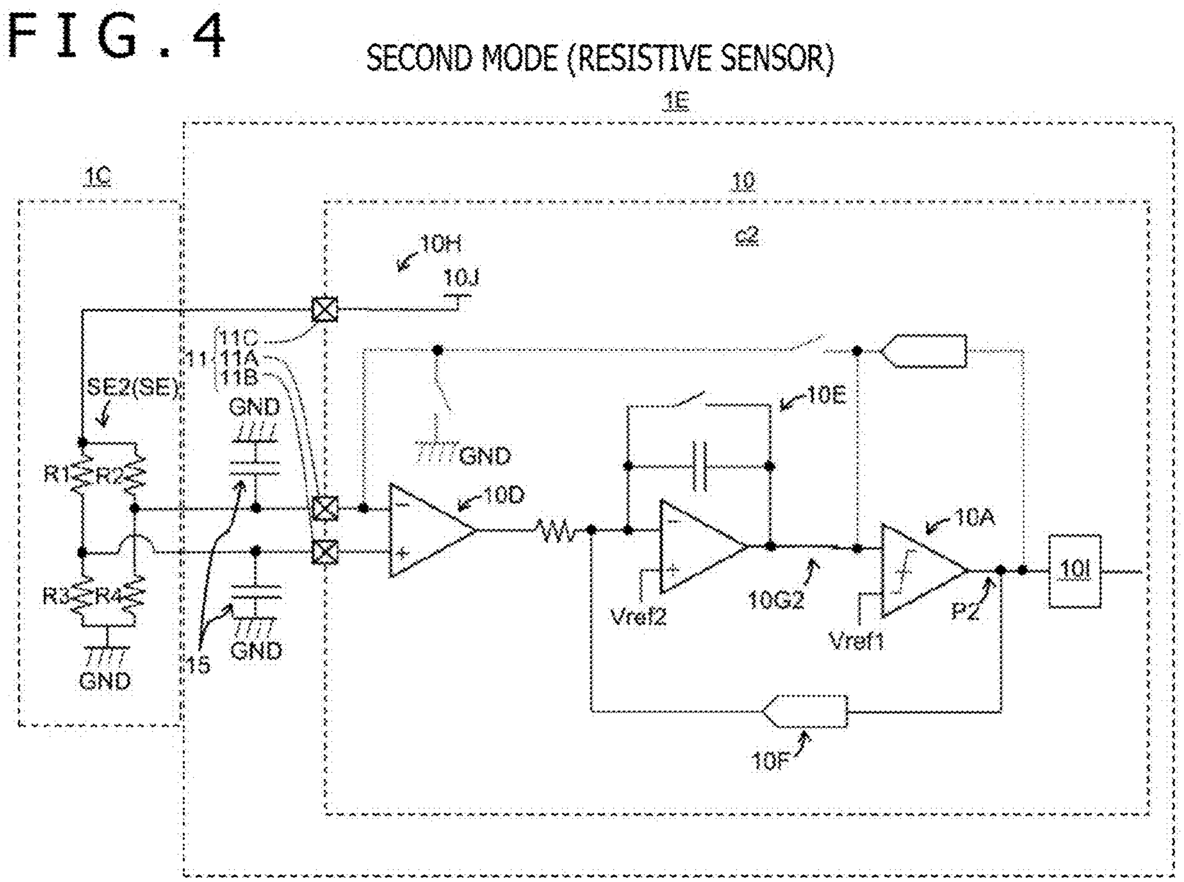
FIG. 4 is a schematic view illustrating a state in which a resistive sensor SE2 is connected to the detection circuit 10 illustrated in FIG. 2 and the detection circuit 10 operates in a second mode. Note that the circuit part not in operation in FIG. 4 is schematically illustrated in dashed lines.

As illustrated in FIG. 4, the resistance detection circuit c2 includes the common AD circuit 10A, the amplification circuit 10D, the integration circuit 10E, the second feedback circuit 10F, the mode selector switch 10G2, and the digital filter 10I. Moreover, the resistance detection circuit c2 is configured to acquire the pen pressure data based on a voltage difference between a plurality of terminal portions of the connector 11 (voltage difference between the first terminal portion 11A and a second terminal portion 11B).

Common AD Circuit 10A

The common AD circuit 10A is a comparator and is configured to convert an analog signal from the pen pressure sensor SE into a digital signal. As described next, the common AD circuit 10A is a circuit used in common in the capacitance detection circuit cl and the resistance detection circuit c2 (the first and second modes).

During the execution of the first mode, one of a pair of input terminals (inputs) of the common AD circuit 10A receives an analog signal from the pen pressure sensor SE (the capacitive sensor SE1) and a feedback signal from the first feedback circuit 10C, and the voltage of the other of the pair of input terminals (inputs) of the common AD circuit 10A is a predetermined reference voltage Vref1. In addition, during the execution of the first mode, the output signal of the common AD circuit 10A is output to the digital filter 10I, and the first feedback circuit 10C is used to perform delta-sigma conversion and feed back the signal to the input of the common AD circuit 10A.

During the execution of the second mode, one of the pair of input terminals (inputs) of the common AD circuit 10A receives an analog signal from the integration circuit 10E, and the voltage of the other of the pair of input terminals (inputs) of the common AD circuit 10A is the predetermined reference voltage Vref1. Note that the reference voltage Vref1 during the execution of the first mode and the reference voltage Vref1 during the execution of the second mode can be set to a common value. Here, the magnitude of the reference voltage Vref1 is larger than 0 but smaller than the power supply voltage, and, for example, the reference voltage Vref1 can be set to approximately one half of the power supply voltage. In addition, the reference voltage Vref1 during the execution of the first mode and the reference voltage Vref1 during the execution of the second mode may be different, and in this case, the magnitude of the reference voltage Vref1 is also larger than 0 but smaller than the power supply voltage.

Reset Switch 10B

The reset switch 10B is connected to a node to which the analog signal from the pen pressure sensor SE (the capacitive sensor SE1) is transmitted. That is, the reset switch 10B is connected to the first terminal portion 11A described later of the connector 11 (output of the capacitive sensor SE1). Specifically, the reset switch 10B is connected to a transfer path connecting the first terminal portion 11A and the inputs (input terminals) of the common AD circuit 10A in a manner bypassing the amplification circuit 10D and the integration circuit 10E.

When the reset switch 10B is OFF, the capacitance of the capacitive sensor SE1 changes according to the operation performed by the user, and the input terminals of the common AD circuit 10A are charged according to the change in the capacitance. That is, the voltage in the first terminal portion 11A can rise when the reset switch 10B is OFF, and the voltage is reset to the voltage of the ground when the reset switch 10B is turned on.

First Feedback Circuit 10C

The first feedback circuit 10C (capacitive digital-to-analog converter (CDAC) circuit) has a function of feeding back the output signal of the common AD circuit 10A to the input of the common AD circuit 10A, and the first feedback circuit 10C charges the common AD circuit 10A. The first feedback circuit 10C contributes to the operational stability of the capacitance detection circuit c1 in the first mode. The first feedback circuit 10C has a function of performing the delta-sigma conversion of the output signal of the pen pressure sensor SE along with the common AD circuit 10A. Note that the configuration of the first feedback circuit 10C can be changed to handle a situation in which the capacitive sensors SE1 with various capacitance values are installed.

Amplification Circuit 10D

The amplification circuit 10D is a differential amplifier and is configured to amplify the output signal from the pen pressure sensor SE (the resistive sensor SE2). In the amplification circuit 10D, one of inputs (inverting input terminal) is connected to the first terminal portion 11A described later of the connector 11, and the other input (non-inverting input terminal) is connected to the second terminal portion 11B of the connector 11. The voltage range of the output signal of the resistive sensor SE2 is significantly smaller than the voltage range of the output signal of the capacitive sensor SE1 (while the full scale of the capacitive sensor is, for example, approximately 1 V, the full scale of the resistive sensor is, for example, approximately 60 mV), and the resistive sensor SE2 tends to be influenced by power supply noise or the like. Hence, to remove the influence of common mode noise, the amplification circuit 10D that is an amplifier with a differential configuration is used in the resistance detection circuit c2.

Integration Circuit 10E

The integration circuit 10E includes constituent elements including a resistor, an amplification circuit (amplifier), and a capacitor and a switch connected in parallel to the amplification circuit (amplifier). An inverting input terminal of the amplification circuit of the integration circuit 10E is connected to an output (output terminal) of the amplification circuit 10D through the resistor, and a reference voltage Vref2 is supplied to a non-inverting input terminal. In addition, an output (output terminal) of the integration circuit 10E is connected to the input terminals of the common AD circuit 10A. The integration circuit 10E is configured to generate an output signal corresponding to the time integral of the voltage supplied from the amplification circuit 10D. The output voltage of the integration circuit 10E is adjusted according to the value of the resistance of the integration circuit 10E and the capacitance of the capacitor. Note that, when the switch of the integration circuit 10E is turned ON, the output voltage is reset.

Second Feedback Circuit 10F

The second feedback circuit 10F has a function of feeding back the output signal of the common AD circuit 10A to the input of the integration circuit 10E and contributes to the operational stability of the resistance detection circuit c2 in the second mode. The second feedback circuit 10F has a function of performing the delta-sigma conversion of the output signal of the pen pressure sensor SE along with the amplification circuit 10D that is a differential amplifier, the integration circuit 10E, and the common AD circuit 10A.

Mode Selector Switches 10G1 and 10G2

ON and OFF of the mode selector switches 10G1 and 10G2 can be switched according to the mode determined by the controller 12. In the first mode (the capacitance detection circuit c1 is driven), the mode selector switch 10G1 is turned ON, and the mode selector switch 10G2 is turned OFF. In contrast, in the second mode (the resistance detection circuit c2 is driven), the mode selector switch 10G2 is turned ON, and the mode selector switch 10G1 is turned OFF.

Power Supply Switch 10H

The power supply switch 10H is connected to the power supply 10J and is used during the execution of the second mode. The power supply switch 10H is turned ON and OFF to supply the voltage of the power supply 10J to the pen pressure sensor SE (resistive sensor SE2). Since the detection circuit 10 includes the power supply switch 10H, the supply of voltage to the pen pressure sensor SE is appropriately cut off, and the power consumption of the second mode can be reduced. In the embodiments, the power supply switch 10H is turned ON to measure the pen pressure (to acquire the pen pressure data), and the power supply switch 10H is turned OFF except when the pen pressure is measured.

Digital Filter 10I

The digital filter 10I is configured to receive an output signal of the common AD circuit and apply a desirable filtering process to the output signal to generate pen pressure data. The controller 12 described later applies a counting process to the pen pressure data generated by the digital filter 10I, to generate a pen pressure value.

Power Supply 10J

The power supply 10J includes a power supply circuit, and the power supply circuit of the power supply 10J has a function of adjusting the voltage supplied from the power supply 1D to a predetermined voltage and supplying the adjusted voltage to the resistive sensor SE2. The power supply 10J is connected to a third terminal portion 11C of the connector 11 through the power supply switch 10H.

1-2-2. Connector 11

As illustrated in FIGS. 3 and 4, the connector 11 has a function of electrically connecting the detection circuit 10 and the pen pressure sensor SE, and the connector 11 includes terminal portions in the first embodiment. The number of the plurality of terminal portions of the connector 11 is three or less, and the number is three in the first embodiment. That is, the connector 11 includes the first to third terminal portions 11A to 11C. Further, at least some of the terminal portions of the connector 11 are used in common in the first and second modes. In the first embodiment, the first terminal portion 11A and the second terminal portion 11B are used in common, and space saving is realized.

The first terminal portion 11A is connected to the output of the capacitive sensor SE1 in the first mode and connected to the resistive sensor SE2 in the second mode.

The second terminal portion 11B is connected to the ground in the first mode, and the voltage of the second terminal portion 11B is a ground voltage. The second terminal portion 11B is connected to the resistive sensor SE2 in the second mode.

The third terminal portion 11C is a terminal portion used in the second mode and is connected to the power supply 10J. In other words, the third terminal portion 11C connects the power supply 10J and the resistive sensor SE2 when the second mode is executed.

1-2-3. Controller 12

Figure 5B:
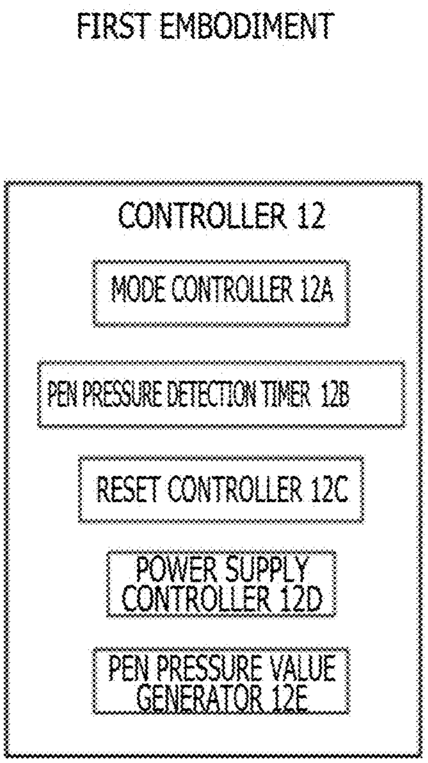
FIG. 5B is a functional block diagram of a controller 12 illustrated in FIG. 5A.

The controller 12 can execute various types of data processing in the stylus 1, and the controller 12 can include, for example, a CPU or the like. As illustrated in FIG. 5B, the controller 12 includes, for example, a plurality of functional units including a mode controller 12A, a pen pressure detection timer 12B, a reset controller 12C, a power supply controller 12D, and a pen pressure value generator 12E. In addition, the controller 12 can execute, for example, various types of control, such as control of the operation of the switch of the integration circuit 10E, control of the operation of the digital filter 10I, and control of the reference voltage of the common AD circuit 10A.

The mode controller 12A is configured to drive one of the capacitance detection circuit c1 and the resistance detection circuit c2 in reference to firmware stored in the storage device 13. In other words, the mode controller 12A executes one of the first and second modes in reference to the firmware stored in the storage device 13. Further, the mode controller 12A controls the mode selector switches 10G1 and 10G2 according to the executed mode.

The pen pressure detection timer 12B has a function of determining whether or not to start the detection of the output signal of the pen pressure sensor SE at a desired timing.

The reset controller 12C can switch the reset switch 10B from ON to OFF when, for example, a predetermined period has passed after the pen pressure detection timer 12B has determined to start the detection, and the reset controller 12C can switch the reset switch 10B from OFF to ON when the pen pressure detection timer 12B determines to stop the detection.

The power supply controller 12D is configured to control the power supply switch 10H according to a predetermined condition. The predetermined condition of the power supply controller 12D can appropriately be set according to, for example, the power consumption.

The pen pressure value generator 12E is configured to count the output signal of the digital filter 10I and generate a pen pressure value. In other words, the pen pressure value generator 12E generates the pen pressure value based on the integral value of the output signal of the digital filter 10I in a predetermined period.

1-2-4. Storage Device 13

Various types of data, such as firmware for executing the first and second modes, for example, are stored in the storage device 13 illustrated in FIG. 5A. Note that, in the first embodiment, the firmware is firmware for the capacitive sensor SE1 or firmware for the resistive sensor SE2.

1-2-5. Transfer Circuit 14

The transfer circuit 14 illustrated in FIG. 5A can use the stylus electrode 1B to transfer (transmit and receive) data to and from the sensor apparatus 2. In the first embodiment, the transfer circuit 14 transfers the downlink signal DS and the uplink signal US.

1-2-6. Capacitor 15

The capacitor 15 can include, for example, a chip capacitor, and the capacitor 15 is mounted on the arrangement unit 15*t* of the circuit board 1E. Specifically, when the resistive sensor SE2 is used as the pen pressure sensor SE, the capacitor 15 is mounted on the arrangement unit 15*t* of the circuit board 1E (see FIG. 4). Note that the capacitor 15 is provided independently of the detection circuit 10 that is packaged as an IC, on the circuit board 1E. In other words, the capacitor 15 is arranged outside the detection circuit 10 as a body separate from the detection circuit 10 packaged as an IC, on the circuit board 1E. As illustrated in FIG. 4, the pair of capacitors 15 are connected to the respective resistors included in the resistive sensor SE2. Specifically, one of the capacitors 15 is connected to and between the resistor of the resistive sensor SE2 and the first terminal portion 11A, and the other of the capacitors 15 is connected to and between the resistor of the resistive sensor SE2 and the second terminal portion 11B. Note that, when the capacitive sensor SE1 is used as the pen pressure sensor SE, the capacitors 15 are not mounted on the arrangement units 15*t* of the circuit board 1E (see FIG. 3).

Note that each capacitor 15 is connected to the ground, and the ground is reinforced. The capacitance value (pF) of each capacitor 15 is, for example, 10 to 1000. Specific examples of the capacitance value (pF) of each capacitor 15 include 10, 20, 30, 40, 50, 60, 70, 80, 90, and 100, and the capacitance value (pF) may be in a range between two of the values illustrated here. In addition, specific examples of the capacitance value (pF) include 100, 200, 300, 400, 500, 600, 700, 800, 900, and 1000, and the capacitance value (pF) may be in a range between two of the values illustrated here.

Note that the arrangement units 15*t* are provided on the circuit board 1E regardless of which one of the capacitive sensor SE1 and the resistive sensor SE2 is installed on the stylus 1 in the first embodiment, and the circuit board 1E is shared to allow the circuit board 1E to be used in both the first and second modes. However, the configuration is not limited to this. That is, the circuit board 1E for the resistive sensor provided with the arrangement units 15*t* and the circuit board 1E for the capacitive sensor not provided with the arrangement units 15*t* may be separately provided.

In addition, although the capacitors 15 are independent of the detection circuit 10 in the description of the first embodiment, the configuration is not limited to this. As long as the capacitors 15 are connected to the first terminal portion 11A and the second terminal portion 11B, the capacitors 15 may be included in the detection circuit 10.

1-3. Description of Operation

1-3-1. First Mode (Capacitive Sensor)

Figure 6:
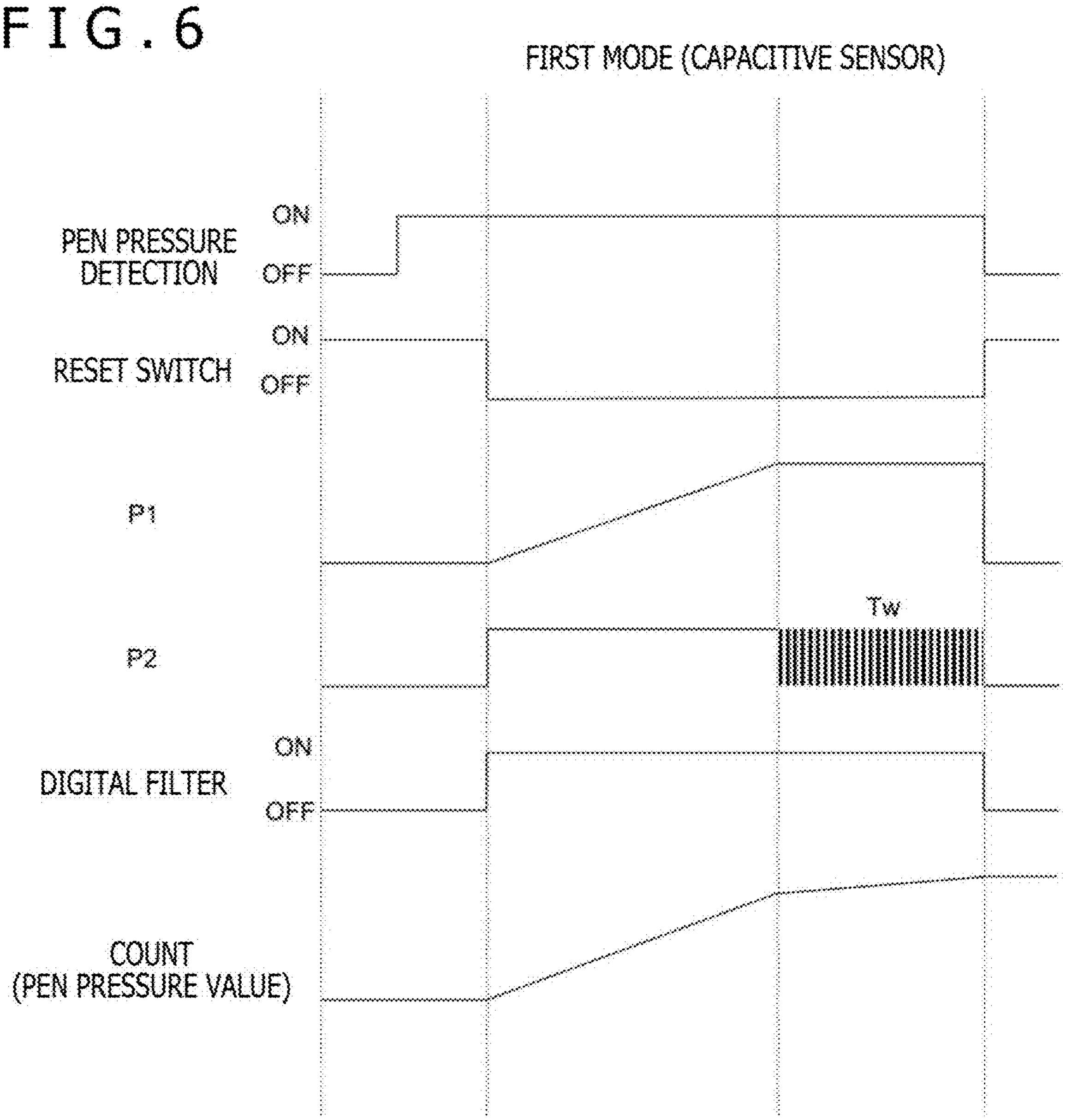
FIG. 6 illustrates a state of various components when the first mode is executed.

As illustrated in FIG. 6, the pen pressure detection timer 12B starts (turns ON) the pen pressure detection at a predetermined timing. Once the pen pressure detection is started, the reset controller 12C switches the reset switch 10B in the ON state to the OFF state, and a node P1 illustrated in FIG. 3 can be charged. In addition, the controller 12 switches the digital filter 10I to the ON state. Note that the node P1 corresponds to the potential of the first terminal portion 11A and the inputs (input terminals) of the common AD circuit 10A.

Once the reset switch 10B enters the OFF state, the node P1 is gradually charged, and the voltage of the node P1 rises. The voltage can be risen up to the reference voltage Vref1, and the voltage of the node P1 becomes constant when the voltage of the node P1 reaches the reference voltage Vref1. Note that the larger the pen pressure, the slower the rise in the voltage, and the length of time to reach the reference voltage Vref1 becomes long. Specifically, the capacitive sensor SE1 includes electrodes (capacitors) that allow the facing distance to change. The larger the pen pressure, the smaller the distance between the electrodes of the capacitive sensor SE1. Assuming that the area and the dielectric constant of the electrodes are constant, the capacitance value of the capacitive sensor SE1 increases when the distance between the electrodes of the capacitive sensor SE1 becomes small. In addition, the capacitors have a relation of V= (I/C) xt (where V is voltage, I is current, C is capacitance value, and t is time). Hence, the voltage V is less likely to rise when the capacitance value C increases.

The voltage of a node P2 corresponding to the output signal of the common AD circuit 10A is constant until the node P1 reaches the reference voltage Vref1 as illustrated in FIG. 6. Note that the first feedback circuit 10C uses the delta-sigma conversion to feed back the output signal (voltage of node P2) of the common AD circuit 10A to the input of the common AD circuit 10A.

Since the delta-sigma conversion is performed, the voltage of the node P2 corresponding to the output signal of the common AD circuit 10A randomly becomes High and Low (0 and 1) approximately half-and-half (see signal Tw of FIG. 6) once the voltage of the node P1 reaches the reference voltage Vref1. Note that the signal TW of FIG. 6 is schematically illustrated, and High and Low (0 and 1) may not alternately occur.

The output signal of the common AD circuit 10A goes through the digital filter 10I, and pen pressure data is generated. Further, the pen pressure value generator 12E of the controller 12 counts the number of times that the pen pressure data is High, in reference to the pen pressure data that has gone through the digital filter 10I, and generates a pen pressure value.

1-3-2. Second Mode (Resistive Sensor)

Figure 7:
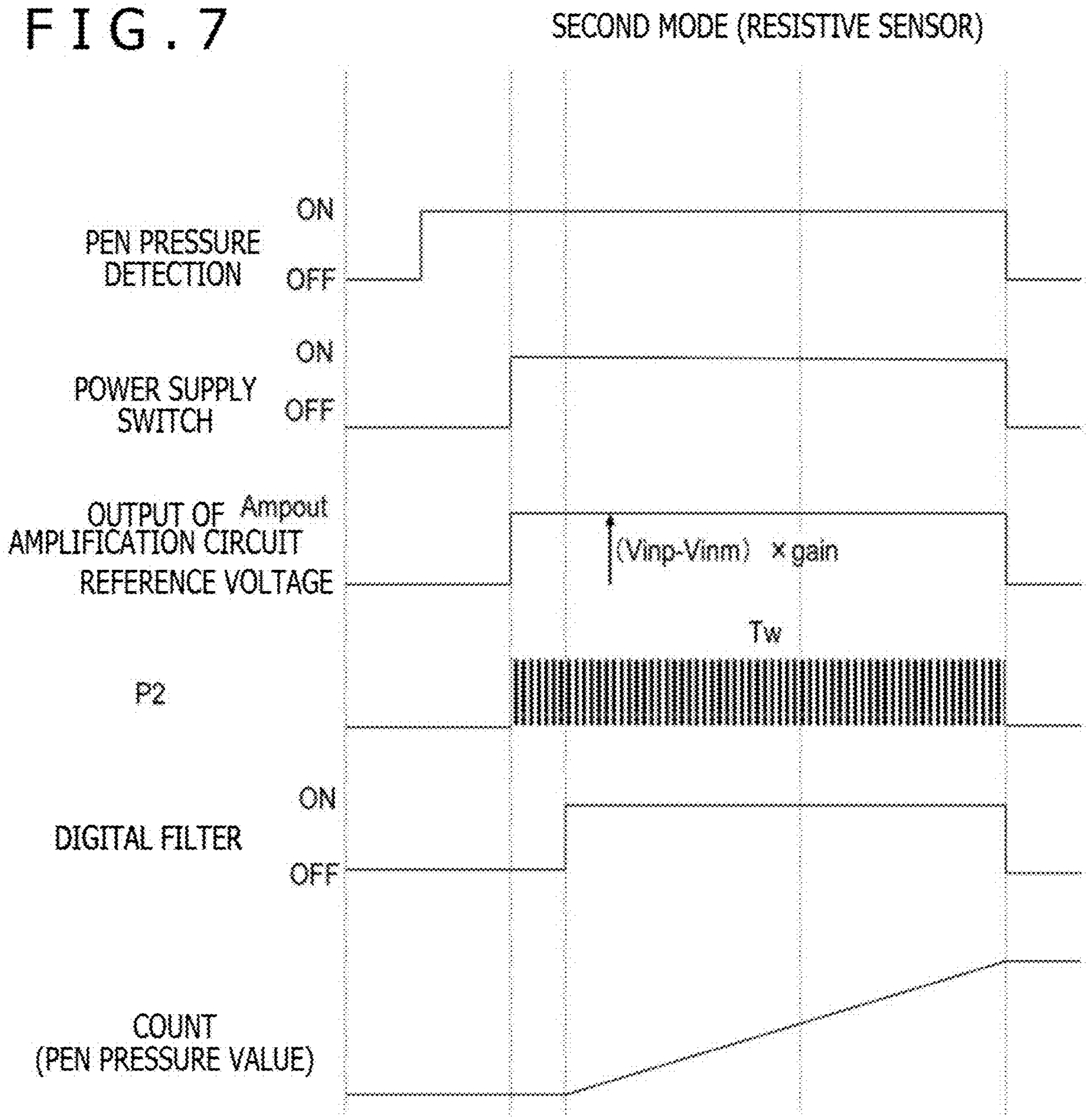
FIG. 7 illustrates a state of various components when the second mode is executed.

As illustrated in FIG. 7, the pen pressure detection timer 12B starts (turns ON) the pen pressure detection at a predetermined timing. Once the pen pressure detection is started, the power supply controller 12D switches the power supply switch 10H to the ON state. In addition, the controller 12 switches the digital filter 10I to the ON state.

Once the power supply switch 10H enters the ON state, the current is supplied to the resistors forming the bridge circuit of the resistive sensor SE2, and the signal corresponding to the pen pressure is further supplied to the first terminal portion 11A and the second terminal portion 11B. The amplification circuit 10D including the differential amplifier amplifies the difference between the signal of the first terminal portion 11A and the signal of the second terminal portion. In FIG. 7, the signal of the first terminal portion 11A corresponds to a voltage Vinp, and the signal of the second terminal portion 11B corresponds to a voltage Vinm. The difference between the signals corresponds to Vinp-Vinm. In addition, Ampout in FIG. 7 is a voltage obtained by multiplying the difference (Vinp-Vinm) by a gain (gain) of the amplification circuit 10D. Note that the difference between the signal of the first terminal portion 11A and the signal of the second terminal portion corresponds to the pen pressure. The signal amplified by the amplification circuit 10D is supplied to the inputs (input terminals) of the common AD circuit 10A through the integration circuit 10E.

The delta-sigma conversion is used to feed back the output signal of the common AD circuit 10A (voltage of node P2). Accordingly, the voltage of the node P2 corresponding to the output signal of the common AD circuit 10A randomly becomes High and Low (0 and 1) (see signal TW of FIG. 7). Note that the signal TW of FIG. 7 is schematically illustrated, and High and Low (0 and 1) may not alternately occur. In addition, the numbers of High and Low in the signal TW vary according to the pen pressure.

The output signal of the common AD circuit 10A goes through the digital filter 10I, and pen pressure data is generated. Furthermore, the pen pressure value generator 12E of the controller 12 counts the number of times that the pen pressure data is High, in reference to the pen pressure data that has gone through the digital filter 10I, and generates a pen pressure value.

1-4. Effects of First Embodiment

The pen pressure detection performance of the stylus is one of the important elements of performance of the stylus. The sensors for pen pressure detection installed on the stylus include the capacitive sensor, and in addition, the resistive sensor manufactured by, for example, micro electro-mechanical systems (MEMS), is increasingly installed. Here, the analog circuit necessary for detection varies between the resistive sensor and the capacitive sensor. Thus, to manufacture each of the stylus provided with the capacitive sensor and the stylus provided with the resistive sensor, both the circuit board including the detection circuit for the resistive sensor and the circuit board including the detection circuit for the capacitive sensor need to be independently designed, and this increases the burden of design.

In contrast, the detection circuit 10 of the stylus 1 according to the embodiments can selectively operate in the first and second modes, and the detection circuit 10 operates regardless of whether the capacitive sensor SE1 is installed or the resistive sensor SE2 is installed. This can prevent independent designing of the circuit boards for both sensors, and the workload of design and the increase in design time can be reduced. In addition, since this can prevent independent designing of the circuit boards for both sensors, complication of management due to an increase in variations of circuit boards can easily be reduced, and an effect of reducing the complexity of the manufacturing process, such as assembly work of the stylus 1, can be expected.

If both the analog circuit for the capacitive sensor and the analog circuit for the resistive sensor are installed on the circuit board of the stylus, the chip area increases, and this increases the cost. In addition, the performance required of the AD conversion circuit varies between the resistive sensor and the capacitive sensor. Conventionally, while an integrated analog-to-digital converter (ADC) is mounted on the detection circuit in the stylus provided with the capacitive sensor, an ADC with a function of normal sequential comparison is often mounted in the stylus provided with the resistive sensor. Thus, if both ADCs are mounted on the detection circuit to handle both the capacitive sensor and the resistive sensor, the chip area increases, and this increases the cost.

In contrast, the capacitance detection circuit cl driven during the execution of the first mode and the resistance detection circuit c2 driven during the execution of the second mode include the shared common AD circuit 10A in the first embodiment, and the AD conversion circuit that tends to be large in circuit scale is shared. Hence, the first embodiment can realize the space saving (reduce the chip area) and can reduce the increase in cost.

In addition, if both the analog circuit for the capacitive sensor and the analog circuit for the resistive sensor are installed on the circuit board of the stylus, the number of terminal portions of the IC increases, and this increases the cost.

In contrast, some of the terminal portions of the connector 11 (the first terminal portion 11A and the second terminal portion 11B in the example of the first embodiment) are used in common in the first and second modes in the first embodiment. Thus, the number of terminal portions can be reduced, and the space saving of the circuit board can be realized. The increase in the cost can also be reduced.

In the first embodiment, the circuits (the first feedback circuit 10C and the second feedback circuit 10F) that perform the delta-sigma conversion to feed back the output signal of the common AD circuit 10A are included in both the first and second modes. Thus, the errors in the output signal of the common AD circuit 10A can be averaged, and the accuracy of the output signal of the common AD circuit 10A can be improved.

The current supplied to the resistive sensor SE2 is larger than the current supplied to the capacitive sensor SE1, and the power consumption tends to increase (for example, approximately 330 μA when the voltage of the power supply 10J is 1.8 V). Hence, the detection circuit 10 includes the power supply switch 10H that can switch ON and OFF of the electrical continuity with the power supply 10J in the first embodiment, and the power consumption can be reduced.

In the first embodiment, the capacitance detection circuit cl includes the reset switch 10B that can set the voltage of the node of the output of the pen pressure sensor SE (the capacitive sensor SE1) to the ground voltage, and the sequentially changing pen pressure caused by the operator of the stylus 1 can be detected.

In addition, during the execution of the second mode (when the resistive sensor SE2 is installed), the resistance detection circuit c2 operates at the predetermined reference voltage when force is not applied to the resistive sensor SE2, and thus, the resistance detection circuit c2 is not connected to the reset switch 10B.

In the first embodiment, the circuit board 1E includes the capacitors 15 connected to the resistors included in the resistive sensor SE2. Thus, when the second mode is executed, the voltage supplied from the power supply 10J to the resistive sensor SE2 is stabilized, and the placement of noise on the output signal of the resistive sensor SE2 can be reduced.

1-5. Modifications

1-5-1. Configuration of Capacitors 15

Figure 8A:
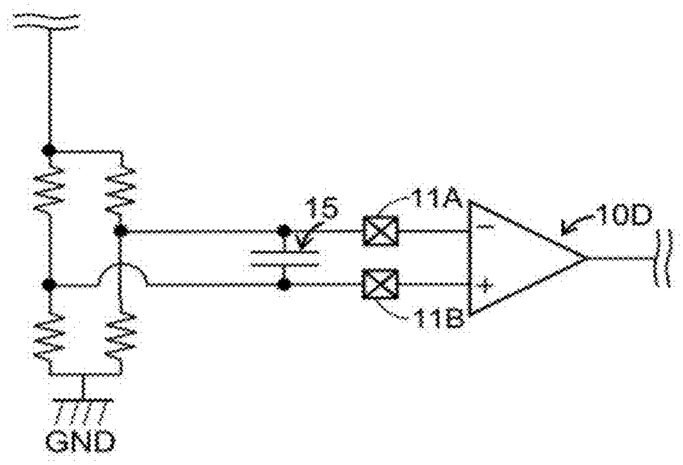
FIG. 8A is a modification of capacitors 15.

In the description of the first embodiment, although the pair of capacitors 15 are connected to the respective resistors included in the resistive sensor SE2, the configuration is not limited to this. As illustrated in FIG. 8A, the capacitor 15 may be provided to connect the first terminal portion 11A and the second terminal portion 11B. In the case of the present configuration, the capacitor 15 is shared, and the amplification circuit 10D including the differential amplifier in the back stage can easily remove the noise.

Figure 8B:
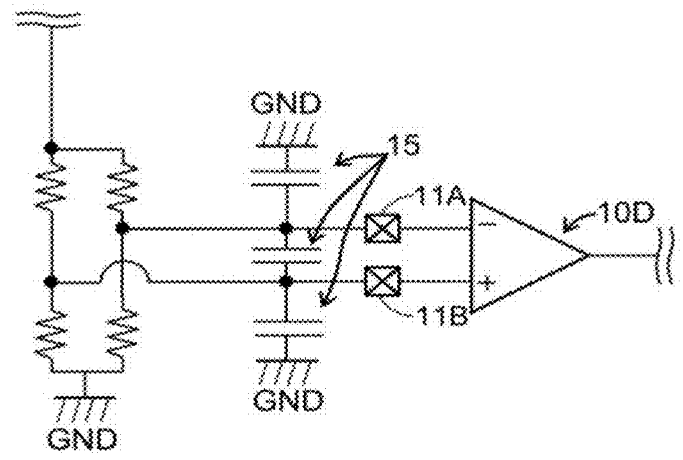
FIG. 8B is a modification of the capacitors 15 different from those in FIG. 8A.

In addition, both the configuration described in the first embodiment and the configuration of the present modification may be adopted as illustrated in FIG. 8B.

1-5-2. Providing Pen Pressure Sensor SE and Detection Circuit 10 in IC

Although the pen pressure sensor SE and the detection circuit 10 (the circuit board 1E) are separated (independent) in the description of the first embodiment, the configuration is not limited to this. The pen pressure sensor SE and the detection circuit 10 (circuit board 1E) may be provided in one common IC.

2. SECOND EMBODIMENT

In a second embodiment, different configurations will mainly be described, and the description of common configurations will appropriately be skipped.

Figure 9:
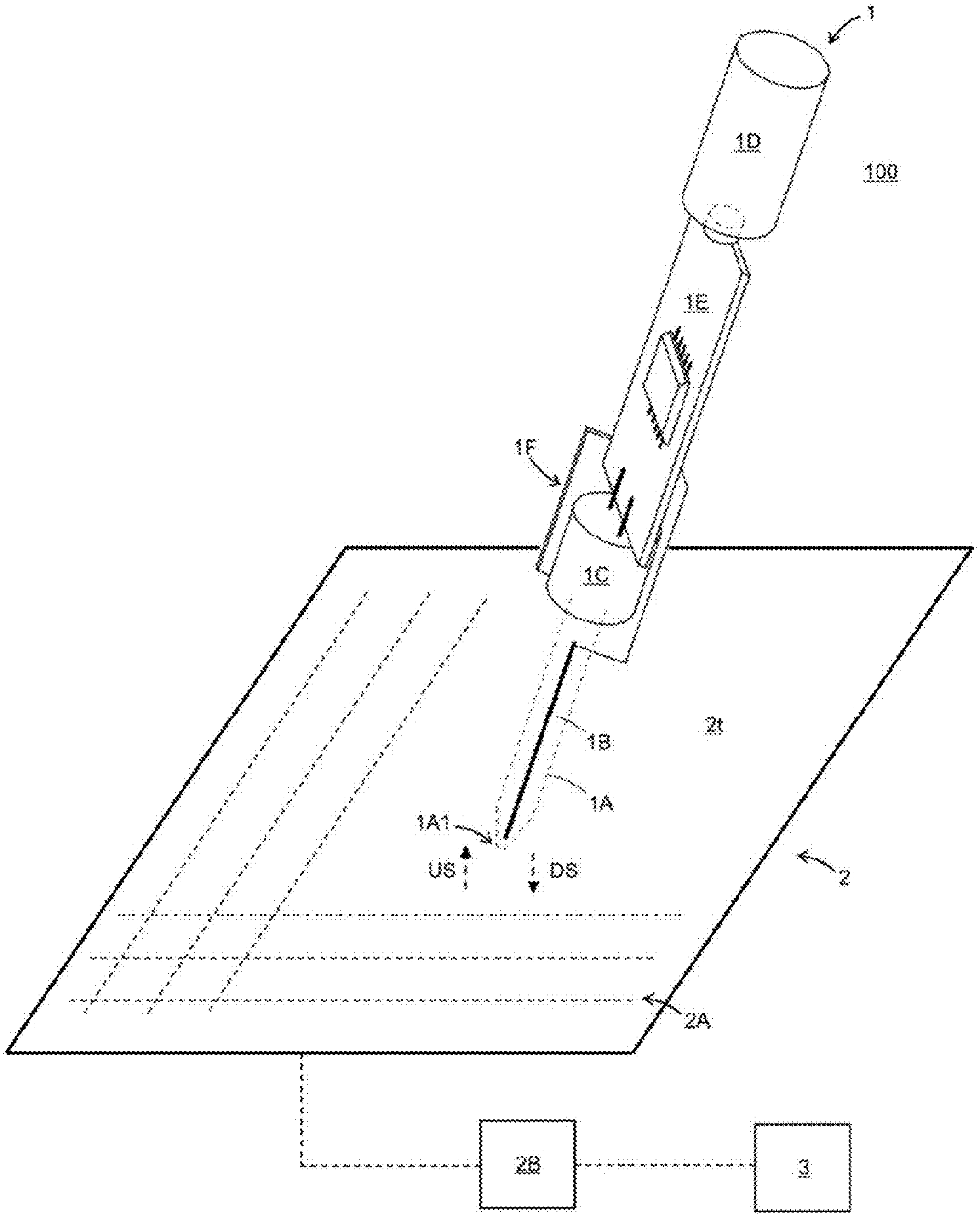
FIG. 9 is a schematic view illustrating a schematic configuration of the stylus system 100 including the stylus 1 according to a second embodiment.

In the second embodiment, the stylus 1 includes a touch detector 1F in addition to the pen pressure detector 1C as illustrated in FIG. 9. The touch detector 1F is arranged on, for example, a side surface portion of the stylus 1, and the touch detector 1F can detect the operation performed by the user, such as contact and force, from the fingers of the user holding the stylus 1.

In the second embodiment, one of the capacitive sensor SE1 and the resistive sensor SE2 is provided on the pen pressure sensor SE, and the other of the capacitive sensor SE1 and the resistive sensor SE2 is provided on the touch detector 1F.

Figure 10A:
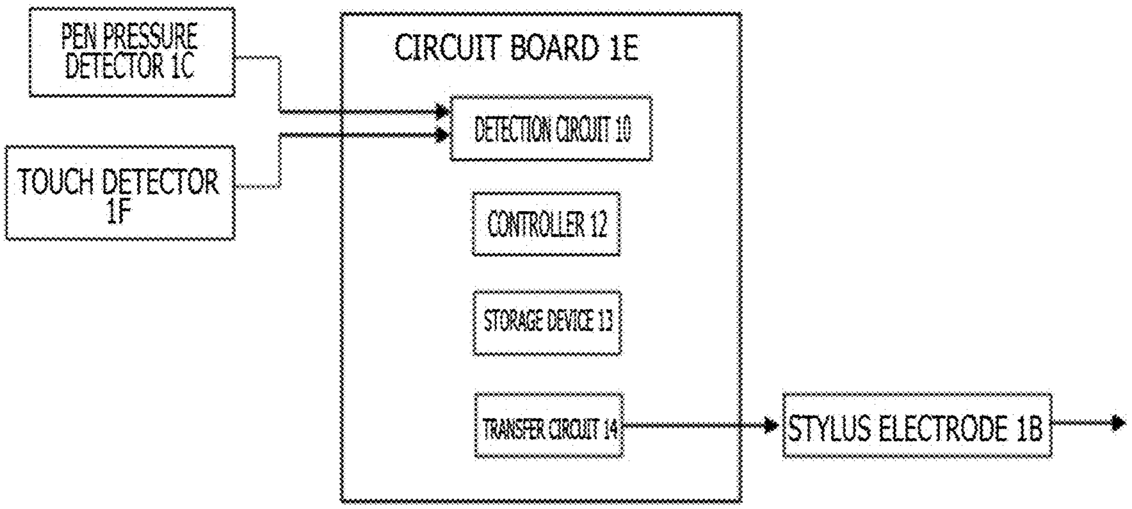
FIG. 10A is a functional block diagram of the circuit board 1E according to the second embodiment.

The configuration of using both the capacitive sensor SE1 and the resistive sensor SE2 is adopted in the second embodiment. Hence, the detection circuit 10 can be connected to the pen pressure detector 1C and the touch detector 1F at the same time as illustrated in FIG. 10A.

The mode controller 12A can alternately switch the first mode and the second mode. For example, the capacitive sensor SE1 is provided on the pen pressure sensor SE, and the resistive sensor SE2 is provided on the touch detector 1F. An example of this case will be described. In this case, the mode controller 12A can operate in the first mode to perform the pen pressure detection, and on the other hand, the mode controller 12A can operate in the second mode to perform the touch detection of the side surface portion of the stylus 1. Note that the mode controller 12A can switch the first mode and the second mode fast to allow the user to feel that the user is executing the pen pressure detection and the touch detection at the same time. That is, the stylus 1 according to the second embodiment is configured to use the capacitive sensor to execute the detection and use the resistive sensor to execute the detection in time series.

Figure 10B:
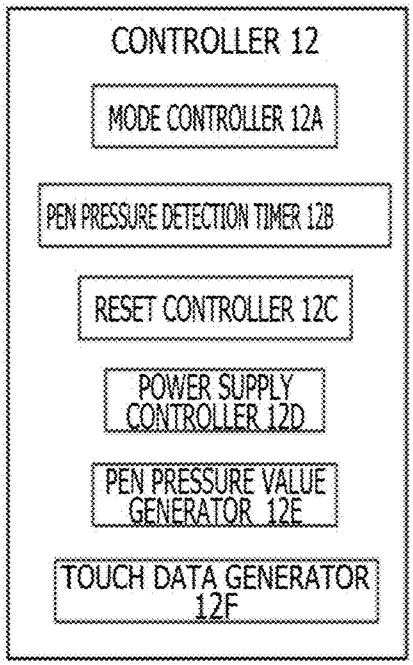
FIG. 10B is a functional block diagram of the controller 12 illustrated in FIG. 10A.

As illustrated in FIG. 10B, the controller 12 further includes a touch data generator 12F, and the touch data generator 12F is configured to count the output signal of the digital filter 10I to generate touch data. Note that the content of the touch data can be determined as desired, and, for example, the touch data can be utilized in various methods, such as changing the type of the line to be drawn.

2-2. Effects of Second Embodiment

In the second embodiment, the mode controller 12A can alternately switch the first mode and the second mode fast to carry out the pen pressure detection and the touch detection substantially at the same time, improving the convenience and the functionality. That is, the second embodiment can obtain the advantageous effects of the first embodiment (the space saving and the reduction of the increase in cost by sharing the common AD circuit 10A and reducing the number of terminal portions of the connector 11) and also has an advantageous effect of improving the convenience and the functionality.

DESCRIPTION OF REFERENCE SYMBOLS

1: Stylus
1A: Core body
1A1: Tip portion
1B: Stylus electrode
1C: Pen pressure detector
1D: Power supply
1E: Circuit board
1F: Touch detector
2: Sensor apparatus
2A: Sensor
2*t*: Touch surface
2B: Sensor controller
3: Host computer
10: Detection circuit
10A: Common AD circuit
10B: Reset switch
10C: First feedback circuit
10D: Amplification circuit
10E: Integration circuit
10F: Second feedback circuit
10G1: Mode selector switch
10G2: Mode selector switch
10H: Power supply switch
10I: Digital filter
10J: Power supply
11: connector
11A: First terminal portion
11B: Second terminal portion
11C: Third terminal portion
12: controller
12A: Mode controller
12B: Pen pressure detection timer
12C: Reset controller
12D: Power supply controller
12E: Pen pressure value generator
12F: Touch data generator
13: Storage device
14: Transfer circuit
15: Capacitor
100: Stylus system
c1: Capacitance detection circuit
c2: Resistance detection circuit
DS: Downlink signal
US: Uplink signal
R1: Resistor
R2: Resistor
R3: Resistor
R4: Resistor
SE: Pen pressure sensor
SE1: Capacitive sensor
SE2: Resistive sensor The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit for use in a stylus, the integrated circuit comprising:
- a plurality of terminal portions; and
- a detection circuit coupled to the terminal portions, wherein:
  - the detection circuit is connectable to a pen pressure sensor that acquires pen pressure data of the stylus,
  - the pen pressure sensor is a capacitive sensor in which a capacitance value changes according to applied force, or a resistive sensor in which a resistance value changes according to applied force,
  - the detection circuit selectively operates in a first mode and a second mode,
  - the detection circuit acquires the pen pressure data based on the capacitance value of the pen pressure sensor while operating in the first mode, and
  - the detection circuit acquires the pen pressure data based on the resistance value of the pen pressure sensor while operating in the second mode.

2. The integrated circuit according to claim 1, wherein:
- the detection circuit includes a capacitance detection circuit and a resistance detection circuit, and the capacitance detection circuit is driven when the detection circuit operates in the first mode, and the resistance detection circuit is driven when the detection circuit operates in the second mode.

3. The integrated circuit according to claim 2, wherein:

the capacitance detection circuit and the resistance detection circuit include a common analog-to-digital circuit, and the common analog-to-digital circuit, in operation, converts an analog signal from the pen pressure sensor into a digital signal, and is used in common in the first and second modes.

4. The integrated circuit according to claim 3, wherein:

the common analog-to-digital circuit is a comparator, the capacitance detection circuit includes a feedback circuit, and the feedback circuit, in operation, performs delta-sigma conversion of an output signal from the common analog-to-digital circuit and feeds back the output signal to an input of the common analog-to-digital circuit while the detection circuit operates in the first mode.

5. The integrated circuit according to claim 3, wherein:

the common analog-to-digital circuit is a comparator, the resistance detection circuit includes an amplification circuit, an integration circuit, and a feedback circuit, the amplification circuit, in operation, amplifies an output signal from the resistive sensor, an input of the integration circuit is connected to the amplification circuit, and an output of the integration circuit is connected to the common analog-to-digital circuit, and the feedback circuit, in operation, performs delta-sigma conversion of an output signal from the common analog-to-digital circuit, and feeds back the output signal to the input of the integration circuit while the detection circuit operates in the second mode.

6. The integrated circuit according to claim 2, wherein:

the detection circuit is connectable to the pen pressure sensor through a connector, the capacitance detection circuit, in operation, acquires the pen pressure data based on an output signal from a terminal portion connected to an output of the capacitive sensor among the plurality of terminal portions, and the resistance detection circuit, in operation, acquires the pen pressure data based on a voltage difference between the plurality of terminal portions.

7. The integrated circuit according to claim 6, wherein a number of the plurality of terminal portions is three or less, and at least some of the plurality of terminal portions are used in common while the detection circuit operates in the first and second modes.

8. The integrated circuit according to claim 6, wherein:

the plurality of terminal portions include first and second terminal portions, when the detection circuit operates in the first mode, the output of the capacitive sensor is connected to the first terminal portion, and the second terminal portion is connected to a ground, and when the detection circuit operates in the second mode, the resistive sensor is connected to the first and second terminal portions.

9. The integrated circuit according to claim 6, wherein:

the plurality of terminal portions include a third terminal portion, and the third terminal portion connects a power supply and the resistive sensor when the detection circuit operates in the second mode.

10. The integrated circuit according to claim 1, further comprising:

a capacitor connected to a resistor included in the resistive sensor.

11. The integrated circuit according to claim 2, wherein:

the capacitance detection circuit includes a reset switch, and the reset switch, in operation, resets a voltage of a node connected to the pen pressure sensor in the capacitance detection circuit to a ground voltage.

12. The integrated circuit according to claim 11, wherein the resistance detection circuit is not connected to the reset switch.

13. The integrated circuit according to claim 2, further comprising:

a mode controller, wherein:

the mode controller, in operation, drives one of the capacitance detection circuit or the resistance detection circuit based on firmware stored in the stylus, and the firmware, in operation, causes the mode controller to drive the capacitive sensor or the resistive sensor.

14. An integrated circuit for use in a stylus, the integrated circuit comprising:

a plurality of terminal portions; and a detection circuit coupled to the plurality of terminal portions, wherein:

the detection circuit is connectable to both a capacitive sensor and a resistive sensor at a same time;

a capacitive value of the capacitive sensor, in operation, changes according to applied force;

a resistance value of the resistive sensor, in operation, changes according to applied force;

the detection circuit selectively operates in a first mode and a second mode, the detection circuit, in operation, acquires pen pressure data of the stylus based on an output signal from a first one of the capacitive sensor and the resistive sensor while the detection circuit operates in the first mode, the detection circuit, in operation, acquires touch data of the stylus based on an output signal from a second one of the capacitive sensor and the resistive sensor while the detection circuit operates in the second mode, and the touch data is data related to contact of a surface of the stylus and a finger.

* * * * *